United States Patent Office 3,697,256
Patented Oct. 10, 1972

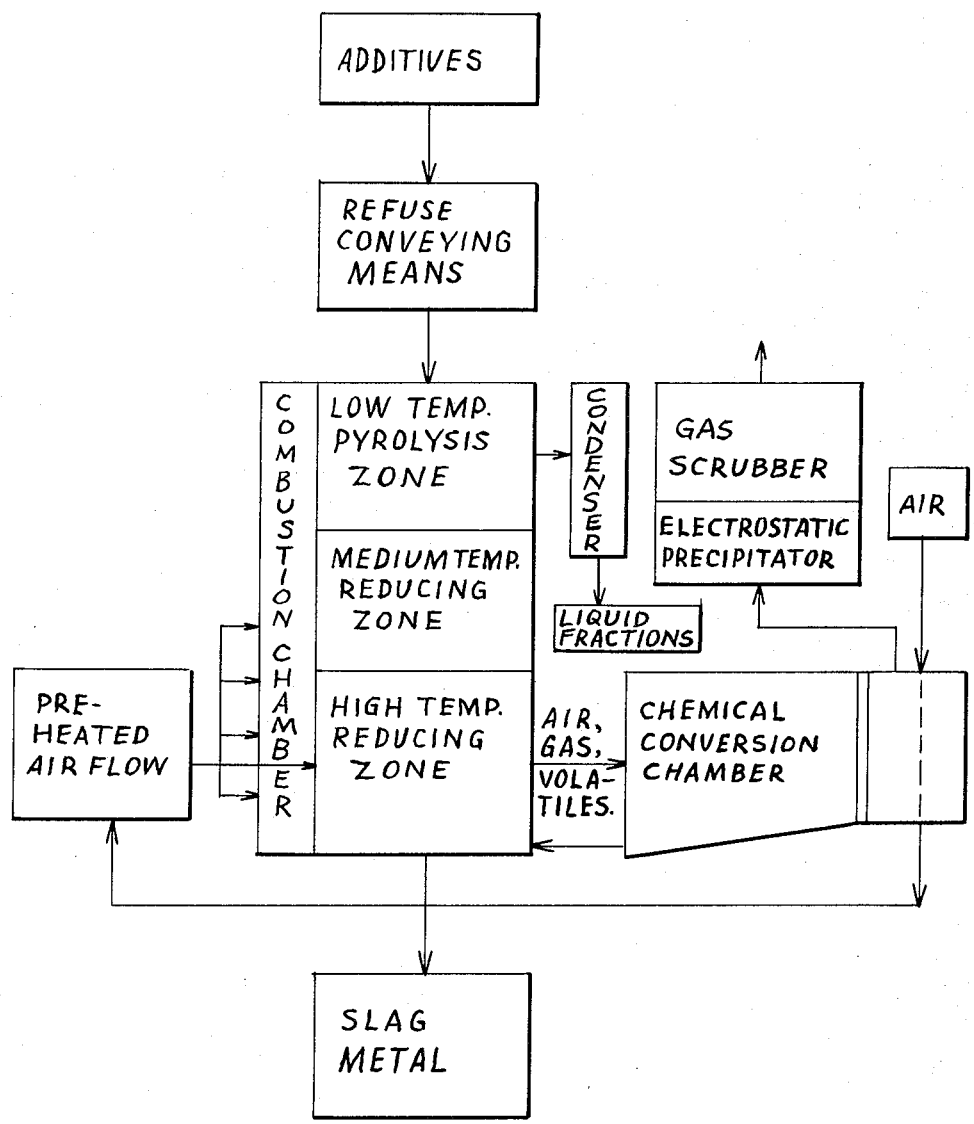
FIG-1-

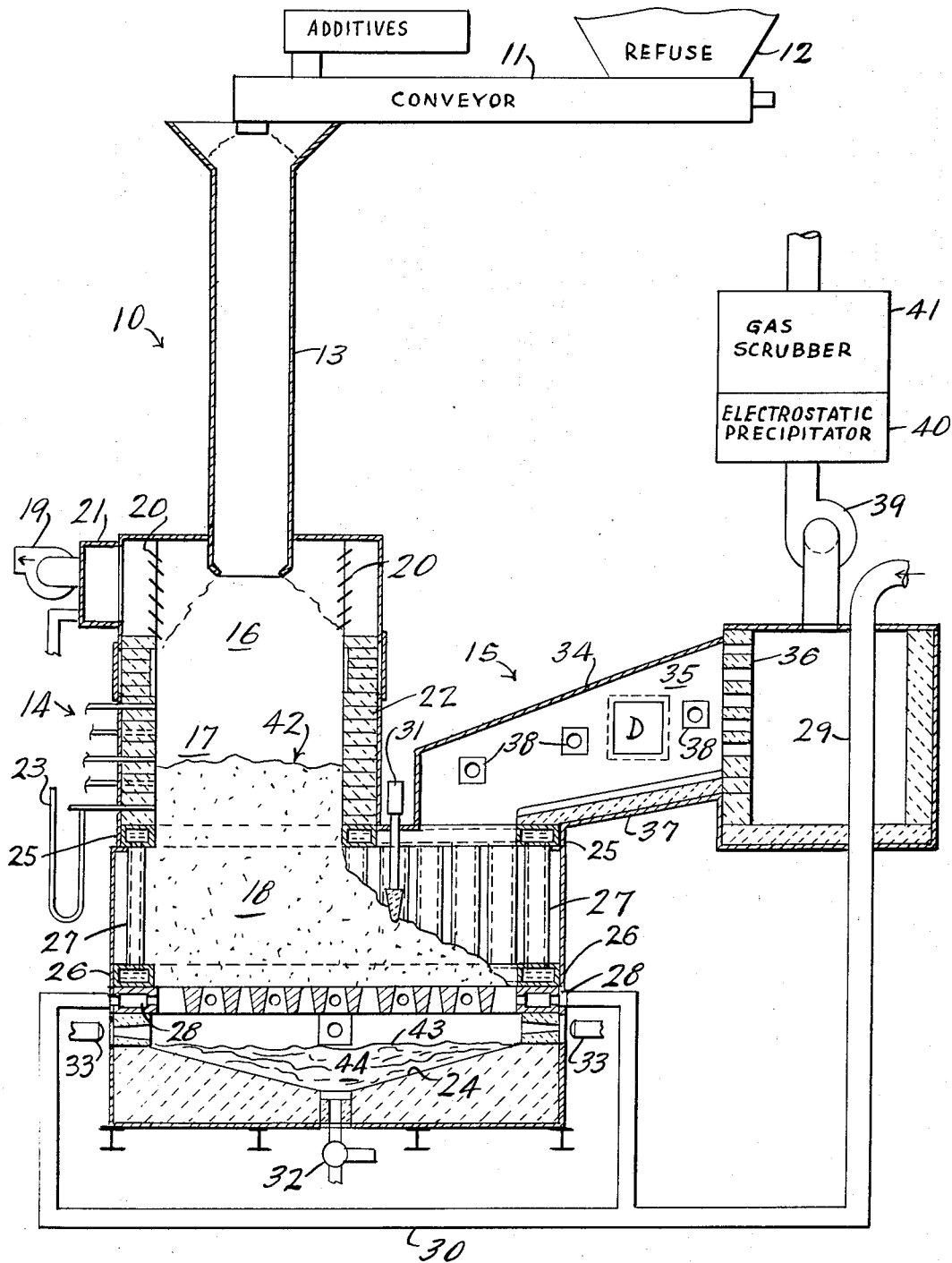
FIG-2-

3,697,256
METHOD OF INCINERATING REFUSE
Isaiah B. Engle, Rte. 3, Tiffin, Ohio 44883
Filed Feb. 8, 1971, Ser. No. 113,167
Int. Cl. F23g 5/02; C21b 15/00; C22b 7/00
U.S. Cl. 75—40    7 Claims

ABSTRACT OF THE DISCLOSURE

A method and apparatus for incinerating solid refuse in which large amounts of useful by-products are recovered and which is substantially air pollution free. The incinerator includes a feed-shaft, a combustion chamber including a low temperature, medium temperature and high temperature zone having a reducing atmosphere, and a chemical reaction zone having an oxidizing atmosphere. Unsorted refuse along with selected additives are placed into the incinerator on top of a coke-bed in the high temperature zone. During incineration, distillates from low temperature pyrolysis in the low temperature zone, and high temperature pyrolysis in the medium temperature zone, are withdrawn through condensers. A variable speed fan operably exhausting the chemical reaction zone is operated to create a neutral pressure point between the medium temperature and the high temperature zone whereby the pyrolysis distillates may be easily separated from a stream of high temperature volatiles and CO produced in the high temperature zone.

The stream of air blowing across the refuse carries the high temperature volatiles into the chemical reaction zone. The chemical reaction zone has a checker-wall constructed of various reactive bricks so that the volatiles react with the bricks to form basic and acidic slag oxides. The slag oxides condense and flow into the hearth of the high temperature zone. Molten iron collects in the interstices of the coke-bed and is removed by casting.

BACKGROUND OF THE INVENTION

This invention relates to a method and apparatus for disposing of solid refuse, including both industrial and household waste.

As society becomes more technically advanced, consumption of consumer goods increases. Increased consumer goods consumption and the accompanying increased production has created disposal problems that require urgent and technically sound solutions. Because of the diverse nature of the many manufacturing processes used to produce an ever increasing variety of goods, the variety of composition of the waste materials from industry and homes is practically limitless.

The disposal of such refuse has generally been accomplished by land-fill operations or incineration methods. With the increasing emphasis on and recognition of pollution as one of our major problems, the use of the above-mentioned methods has come under severe criticism. Landfills are unsightly and unless carefully controlled, attract undesirable rodents; the possibility that such sites contribute to ground water pollution is currently being investigated. Available land suitable for land-fill operations is increasingly difficult to find, especially near densely populated urban areas where a large amount of refuse is generated daily by the inhabitants. Open burning of household and industrial waste can no longer be tolerated; offensive odors, gases and particulate matter contribute further to air pollution.

Recent attempts at controlled burning of refuse in furnaces have met only with partial success; usually such processes are economically unfeasible. Generally it has been necessary to separate the waste material into ferrous and non-ferrous metals, and non-metallics such as paper, rags and plastics. Such separation procedure is both time-consuming and expensive. Additional problems are presented by the attempted incineration of industrial and household waste products together. The highly variable calorific characteristics of industrial waste such as oils, paints, and other organic and inorganic wastes, in combination with household garbage, plastics and paper, makes controlled incineration almost impossible.

Generally, prior art methods of refuse incineration have placed a primary emphasis on mere volume reduction with only incidental recovery of low calorie waste gas and a fused mass of non-combustible matter, which may be processed further and used as a construction material.

SUMMARY OF THE INVENTION

A method and apparatus for incinerating refuse is disclosed which eliminates air pollution and recovers a substantial number of by-products from the refuse.

The incinerator has a combustion chamber with a low temperature, medium temperature, and a high temperature zone, and a chemical reaction zone connected to the high temperature zone. Referring to FIG. 1, suitable additions of limestone, coke, coal and iron oxide are made to the unsorted refuse before it is dumped onto a coke-bed in the high temperature zone of the incinerator. Low temperature pyrolysis of low melting materials takes place in the low temperature zone and high temperature pyrolysis takes place in the medium temperature zone. Variable speed fans pull the distillates produced from the pyrolysis into condensers. Removal of the pyrolysis-produced volatile hydrocarbons leaves a residue of amorphous carbon, metals and other inorganics in the high temperature zone. The inorganic materials and metals such as aluminum, lead, and zinc, having a boiling point less than that of iron, are volatilized by the high temperature produced by the surface combustion of the amorphous carbon. Air passes across this refuse in the high temperature zone, and carries the stream of high temperature volatiles, air, and a large amount of CO into the chemical reaction zone. The chemical reaction zone has a rear checker-wall constructed of aluminum silicate, alumina, chrome and magnesite bricks. A variable speed fan located behind the rear checker-wall removes the high temperature volatiles, air and $CO_2$ from the high temperature zone. The volatiles react with the bricks of the checker-wall and are converted into slag oxides which condense and flow down the checker-walls into the hearth of the high temperature zone. Molten iron collects in the interstices of the coke-bed. The less dense molten slag is removed and quenched. Iron of good quality is removed from the hearth.

An object of this invention is to provide a pollution-free method for incineration of refuse.

A further object of this invention is to provide an economical method for incinerating refuse whereby the refuse may be converted into useful solids, liquids and gases.

A still further object of this invention is to provide a method for incinerating refuse whereby a high quality iron is obtained.

The process and apparatus of the present invention will be more easily understood by reference to the appended drawings which are intended to illustrate, but not to limit, the method and apparatus of this invention.

BRIEF DESCRIPTION OF THE DRAWINGS

In the drawings:
FIG. 1 is a flow chart outlining the steps of the method of the invention;
FIG. 2 is a longitudinal section view of an incinerator plant in accordance with the invention.

DESCRIPTION OF THE PREFERRED EMBODIMENT

The incinerator 10 includes conventional means such as a link-belt conveyor 11 for conveying the refuse 12, a feed-shaft 13, a combustion chamber 14 and a chemical reaction zone 15.

The feed-shaft 13 is constructed of metal such as ½ inch steel plate. The diameter of the feed-shaft 13 determines the maximum dimension of the refuse 12 which can be charged to the incinerator 10. Preferably the internal diameter of the feed-shaft 13 should be limited to about 96 inches for maximum combustion efficiency. The feed-shaft 13 extends into the combustion chamber 14 to permit a better seal of the refuse 12 packed into the feed-shaft 13.

The combustion chamber 14 includes a low temperature zone 16, a medium temperature zone 17, and a high temperature zone 18. The low temperature zone 16 of the combustion chamber 14 can be constructed of any type of material capable of withstanding temperatures up to about 1800° F. A variable speed fan 19, pulls volatiles such as water, hydrocarbons and other distillates through louvers 20 into condensers 21.

The medium temperature zone 17 is constructed of fire brick 22 capable of withstanding a maximum operating temperature of about 2500° F. Manometers 23 are connected through the inner walls of the medium temperature zone 17, to establish a neutral point, to be explained in detail hereinafter.

The high temperature zone 18 is defined as extending from the fire brick 22 to the bottom hearth floor 24. An upper header 25 and a lower header 26 along with cooling pipes 27 are positioned in the wall to water cool the high temperature zone 18. The cooling pipes 27 are mechanically supported by thermally stable concrete. The lower header 26 has tuyeres 28 for feeding air into the high temperature zone 18. It is preferred that the air be preheated before being fed into the high temperature combustion zone 18 in order to obtain maximum temperature in the high temperature zone 18. The preheated air is fed from a preheating unit 29 through bustle pipes 30, and through the tuyeres 28 into the high temperature zone 18. A water cooled curtain wall 31 extends downwardly into the high temperature zone 18. A tap 32 for molten slag and metal is positioned at the lowermost point in the sloped hearth floor 24. Jets 33 for oil or gas are provided to ignite the coke. The curtain-wall 31 prevents the coke-bed from shutting off the flow of volatiles into the chemical reaction zone 15. The curtain-wall 31 also increases the gas velocity into the chemical reaction zone 15.

The chemical reaction zone 15 is connected to the high temperature zone 18. The reaction zone 15 has a roof 34 of silica bricks, sidewalls 35 of high-alumina brick, and a rear checker wall 36 constructed of aluminum silicate, alumina, chrome and magnesite bricks. The bracks in the chemical reaction zone 15 are laid up with a neutral chrome cement. The floor 37 of the reaction zone 15 is constructed of magnesite bricks, and is sloped and troughed in the direction of the high temperature zone 18 in such a manner that the slag flows onto the hearth floor 24. A door D may be built into the wall 35 to allow access to zone 15 for the purpose of renewing the floor 37 with crushed limestone. The oil or gas burner and air inlets 33 placed in the outer periphery of the high temperature zone walls are used to ignite the coke. After the chemical reaction zone 15 is heated to operating temperature, the combination oil or gas burners and air inlets 33 are shut off. Air may be supplied through the inlets 33 during incineration operation. Since it is not necessary to use preheated air in the chemical reaction zone 15, an air supply source may be provided separate from the preheater unit 29 to lessen the demand on the preheater unit 29. A variable speed fan 39, whose use will be explained in detail hereinafter, pulls gases from the high temperature zone 18 through an electrostatic precipitator 40 and a gas scrubber 41, before discharging the gases into the atmosphere.

Referring to FIG. 2, a charge of coke 42 sufficient to fill the high temperature zone 18 is placed into the incinerator 10. Combination gas burners and air inlets 33 in the chemical reaction zone 15 are used to heat the chemical reaction zone 15 only in the start-up of the incinerator. Conventional package spreading devices should be used to open or spread the refuse on the conveyor 11. The refuse 12 to be treated, consisting of unsorted household and industrial waste products, dewatered sewage and agricultural products, is introduced continuously into the incinerator 10 by the conveyor 11. The refuse 12 is monitored by a first operator, who works in conjunction with a second operator monitoring the molten slag 43 and molten metal 44, withdrawn at the slag or metal tap 32. Obviously the composition of refuse 12 to be disposed of will vary greatly. A single load of refuse 12 may contain glass and plastic containers, waste food, paper products, metals such as steel, copper, aluminum, titanium, and large objects such as television sets, chairs and scrap lumber. The operator responsible for monitoring the refuse 12 before it is dumped into the feed-shaft 13 must decide, on the basis of visual observation, and in conjunction with the slag and metal analyses, whether to add limestone and iron oxide along with the coke and coal which are added continuously. For example, if a large amount of aluminum cans or foil are present, the operator will want to add iron oxide, as iron ore or mill scale, to the refuse 12. The coke and coal are used to maintain the furnace operating temperatures, and the coal functions further to prevent the glass waste products from welding together and blanketing the charge. The limestone functions as a flux to reduce the fusion point of the slag produced. The additions of limestone, coke, high-coking coal or iron ore are manually controlled by the first operator from his visual analyses of the raw refuse 12 being conveyed past his station.

Burning of the coke-bed 42 produces an operating temperature in the high temperature zone 18 of about 3600° F.; the use of air preheated to about 1000° F. or higher, produces an operating temperature of about 4000° F. A temperature gradient of about 2500° F. in the medium temperature zone 17 and of about 1800° F. in the low temperature zone 16 is maintained during the operation of the incinerator.

As the refuse 12 enters the feed-shaft 13 during the start-up of the incinerator 10, it falls onto the preheated coke-bed 42. As pyrolysis of the carbonaceous materials progresses, the residue of the refuse 12, consisting of amorphous carbon, metals and inorganics, having the volatile hydrocarbons and moisture removed by pyrolysis, is fed by gravity into the high temperature zone 18 and melted. The high operating temperature of the coke-bed 42 accelerates pyrolysis in the low temperature zone 16 and medium temperature zone 17. The variable speed fan 19 pulls the pyrolysis products such as water and hydrocarbons through the louvers 20 and into the condensers 21. Non-condensible gases are pulled by the fan through the condenser 21 into a gas stripper. The gas stripper uses conventional methods to remove entrained tar and volatiles from the gaseous fraction. The gaseous fraction, containing $H_2S$, $NH_3$, $C_2N_2$ and $SO_2$ is reacted with $H_2SO_4$ to remove the ammonia derivatives as $(NH_4)_2SO_4$. Further treatment of the gaseous fraction with caustic soda solution will remove $H_2S$, $C_2N_2$, and $SO_2$.

The condensing apparatus will yield water, tar, oils and liquor. Further processing of the distillate oils and tars will yield compounds such as olefins, aromatics, paraffins and napthenes. Processing of the light oil fraction will yield such compounds as benzene and toluene. The remaining liquor will contain a major portion of water, with minor amounts of acids, ketones and aldehydes. Catalytic cracking apparatus may be connected prior to the condensers 21 to reduce the amount of tar formation and increase the higher boiling fraction of oils recovered. The additions of high-coking coal made to the refuse 12 helps to upgrade the calorific value of the gas recovered.

Removal of moisture and hydrocarbon distillates in the low temperature zone 16 solves a problem that has confronted prior art methods of incineration. Removal of moisture and other low-temperature distillates by use of a primary or separate drying chamber is not economically feasible. Unless the distillates and moisture produced by pyrolysis are withdrawn prior to the operation of the high temperature zone 18 and chemical reaction zone 15, the incineration process is severely inhibited.

Prior art incineration methods have also encountered difficulties in preventing escape of loose paper and ash. Paper products char easily, and the movement of air and gas in such incinerators has interfered with the operation of electrostatic precipitators and gas scrubbers by overloading them with ash and other particulate matter. As the coke burns in the high temperature zone 18, the paper and other refuse 12 such as bottles and cans, tend to agglomerate. Formation of this agglomerate prevents the ash from flying around the incinerator 10 and interfering with the operation of the electrostatic precipitators 40 and gas scrubber 41. The coke prevents the refuse from the welding together, and acts somewhat as a filter to minimize the movement of ash and particulate matter into the chemical reaction zone 15.

It is crucial that the tuyeres 28 which carry the preheated air into the high temperature zone 18 be positioned in such a manner that the air blast is fed across the refuse 12. By adjusting the variable speed fans 19 and 39 such that a "neutral pressure point" is obtained between the medium and high temperature zones, the products of combustion obtained from the high temperature zone 18 are carried by the variable speed fan 39 into the chemical reaction zone 15 and through the checker walls 36. The use of the "neutral pressure point" to separate the combustion products, i.e., the products produced by the pyrolysis of carbonaceous products, from the CO, metal and inorganic volatiles produced by high temperature combustion, may be supplemented by gas analyses. The $N_2$ content of the pyrolysis—produced gases and distillates should be kept to a minimum. The CO is converted into $CO_2$ in the chemical reaction zone by the oxidizing atmosphere.

The refuse 12 in the high temperature zone 18 will consist in large parts of metals such as copper, iron, titanium and glass products. The lower melting metals will be volatilized along with, for example, the sodium and potassium ions of the glass products. The air blast across the refuse 12 produces a turbulent flow of a gaseous mixture of hot air, CO gas from the combustion of amorphous carbon present, and volatiles. Such turbulence enables the volatiles to react more fully with the high temperature surface of the brickwork in the chemical reaction zone 15. The variable speed fan 39, carries the gaseous mixture through the checker wall 36 and through an electrostatic precipitator 40 and gas scrubber 41.

The rear checker walls 36, constructed of basic, neutral and acid bricks, will react with the hot volatiles to form reaction products of various oxides. The reaction products form the slag 43 which condenses and flows down the inclined floor 37 of the reaction zone 15 and onto the hearth 24 of the high temperature zone 18. The molten slag may be withdrawn through the molten slag taps 32 as desired. It is convenient to quench the slag to produce a fine particulate substance. A large amount of trace elements have been found to be present making the slag useful as a fertilizer additive. Other uses include processing the slag for material suitable for road-work or building material, or the slag may be used as material for clean land-fill operations.

Molten iron accumulates in the interstices of the coke bed 42 and may be withdrawn through the metal tap 32. Removal of the more volatile elements from the molten iron will facilitate the production of a high quality iron, low in phosphorous and sulfur.

What I claim is:

1. A method of incinerating household and industrial refuse in an incinerator having a vertically extending combustion chamber with an upper low temperature zone, an intermediate medium temperature zone and a lowermost high temperature zone interconnected by a common vertical passage through which refuse may pass which passage has its upper end exposed to receive refuse and its lower end terminated above a floor in said high temperature zone and a chemical reaction chamber extending laterally from one side of said lowermost high temperature zone, said low temperature zone having first exhaust means operably connected thereto, said chemical reaction zone having second exhaust means operably connected thereto, said method comprising the steps of
    (a) igniting a coke bed in said high temperature zone,
    (b) adding coke and coal to the refuse prior to its entry into said combustion chamber,
    (c) filling said combustion chamber with said admixed refuse,
    (d) directing a lateral flow of preheated air across the high temperature zone and
    (e) adjusting the said first and second exhaust means to create a neutral pressure point between said high and medium temperature zones whereby high temperature pyrolysis products from the medium temperature zone and low temperature pyrolysis products from the low temperature zone are removed by the said first exhaust means, and high temperature volatiles from the high temperature zone are carried into said chemical reaction zone, and
    (f) removing molten iron from said high temperature zone.

2. The method of claim 1 which further includes the step of adding selected amounts of limestone and iron oxide with said coke and coal to the refuse prior to its entry into said combustion chamber.

3. The method of claim 2 wherein the amounts of limestone and iron oxide added to said refuse are continuously adjusted by an operator in proportion to the composition of the refuse being incinerated.

4. The method of claim 1 which further includes the step of directing the flow of high temperature volatiles within said chemical reaction chamber through a wall of checker brick of varied composition, said checker wall including bricks of acid, neutral and basic composition, to selectively condense said volatiles into slag oxides.

5. The method of claim 4 wherein said checker brick wall comprises aluminum silicate, alumina, chrome and magnesite bricks.

6. The method of claim 1 which further includes the steps of directing the flow of said pyrolysis products from said low and medium temperature zones through at least one condenser to convert a portion thereof into liquid condensate.

7. The method of claim 1 which further includes the step of directing air through a preheating unit and thence into said high temperature zone.

References Cited

UNITED STATES PATENTS

| | | | |
|---|---|---|---|
| 3,554,143 | 1/1971 | Rodgers et al | 110—15 X |
| 3,511,194 | 5/1970 | Stookey | 110—8 R |
| 485,392 | 11/1892 | Koneman | 75—43 |
| 1,755,845 | 4/1930 | Snyder | 75—41 X |
| 2,029,576 | 2/1936 | Kolb | 110—15 |

HENRY W. TARRING, Primary Examiner

U.S. Cl. X.R.

75—28, 43; 110—8 R, 8 E, 15